United States Patent
Meng et al.

(10) Patent No.: US 9,822,024 B2
(45) Date of Patent: Nov. 21, 2017

(54) METHODS AND SYSTEMS FOR WASTEWATER TREATMENT AND RESOURCE RECOVERY

(71) Applicant: Chinese Research Academy of Environmental Sciences, Beijing (CN)

(72) Inventors: Wei Meng, Beijing (CN); Yonghui Song, Beijing (CN)

(73) Assignee: CHINESE RESEARCH ADADEMY OF ENVIRONMENTAL SCIENCES, Beijing (CN)

( * ) Notice: Subject to any disclaimer, the term of this patent is extended or adjusted under 35 U.S.C. 154(b) by 374 days.

(21) Appl. No.: 14/133,659

(22) Filed: Dec. 19, 2013

(65) Prior Publication Data
US 2014/0197111 A1    Jul. 17, 2014

(30) Foreign Application Priority Data
Jan. 11, 2013  (CN) .......................... 2013 1 0010017

(51) Int. Cl.
C02F 1/20    (2006.01)
C02F 1/52    (2006.01)

(52) U.S. Cl.
CPC ............. *C02F 1/5254* (2013.01); *C02F 1/20* (2013.01)

(58) Field of Classification Search
None
See application file for complete search history.

(56) References Cited

U.S. PATENT DOCUMENTS

| | | | |
|---|---|---|---|
| 6,893,567 B1 | 5/2005 | Matias et al. | |
| 7,194,979 B2 | 3/2007 | Moore, Jr. | |
| 7,622,047 B2 | 11/2009 | Koch | |
| 7,811,455 B2 | 10/2010 | Burke | |
| 7,842,186 B2 * | 11/2010 | Chung | C02F 3/28 210/603 |
| 2004/0020859 A1 | 2/2004 | Walker | |
| 2009/0206028 A1* | 8/2009 | Jiang | B01D 53/1468 210/603 |
| 2010/0282674 A1* | 11/2010 | Barak | C02F 1/5245 210/631 |

OTHER PUBLICATIONS

Ayoub et al., "Removal of Low-Concentration Phosphorus Using a Fluidized Raw Dolomite Bed", Water Environment Research, Apr. 2006, vol. 78, No. 4, pp. 353-361.*

(Continued)

*Primary Examiner* — Michael H Wilson
*Assistant Examiner* — Katherine Will
(74) *Attorney, Agent, or Firm* — Treasure IP Group, LLC (57) ABSTRACT

Wastewater treatment methods and systems for removal of phosphorus (P) and nitrogen (N) from wastewater and for recovery of them as usable materials. Sufficient amount of dolomite lime and slaked dolomite lime is added into the wastewater to increase the pH of the wastewater to above 8.5 and to form P precipitates and to convert ammonium to ammonia in a precipitation-ammonia stripping reactor or a continuous flow precipitation reactor. The P precipitates are separated from the wastewater and recovered as usable solid material. The ammonia gas is absorbed and concentrated with acid solution in an ammonia absorption tower as usable liquid material.

17 Claims, 6 Drawing Sheets

(56) References Cited

OTHER PUBLICATIONS

Arogo, J., Zhang, R.H., Riskowski, G.L., Christianson, L.L., Day, D.L., (1999) "Mass transfer coefficient of ammonia in liquid swine manure and aqueous solutions" J. Agric. Eng. Res. 73, 77-86.

Chen, T. H., Huang, X. M., Pan, M., Jin, S., Peng, S. H., Fallgren, P. H. (2009) Treatment of coking wastewater by using manganese and magnesium ores, J. Hazard. Mater., 168, 843-847.

De-Bashan, L.E., Bashan,Y. (2004) Recent advances in removing phosphorus from wastewater and its future use as fertilizer (1997-2003), Wat. Res., 38 4222-4246.

Frijns, J., Zhang, J. H., Ehrenburg, H. http://www.waterworld.com/index/display/article-display/193657/articles/water-wastewater-international/volume-18/issue-7/features/advanced-phosphorous-removal-curbs-eutrophication-in-lake-tai.html.

Gustin, S., Marinsek-Logar, R. (2011)"Effect of pH, temperature and air flow rate on the continuous ammonia stripping of the anaerobic digestion effluent" Process Safety and Environmental Protection 8 9, 61-66.

He, S. L., Zhang, Y., Yang, Min. Du, W. L., Harada, H. (2007) Repeated use of MAP decomposition residues for the removal of high ammonium concentration from landfill leachate, Chemosphere, 66, 2233-2238.

Lesjean, B., Gnirss, R., Adam, C., Kraume, M., Luck, F., (2003) Enhanced biological phosphorus removal process implemented in membrane bioreactors to improve phosphorus recovery and recycling. Wat. Sci. Tech., 48, 87-94.

Liu, W. T., Mino, T., Matsuo, T., Nakamura, K. (1996) Biological phosphorus removal processes—effect of pH on anaerobic substrate metabolism, Wat. Sci. Tech., 34, 25-32.

Maurer M., Boller, M. (1999) Modelling of phosphorus precipitation in wastewater treatment plants with enhanced biological phosphorus removal, Wat. Sci. Tech., 39, 147-163.

Momberg, G. A., Oellermann, R. A. (1992) The removal of phosphate by hydroxyapatite and struvite crystallisation in South Africa. Wat. Sci. Tech., 26, 987-996.

Pastor, L., Mangin, D., Barat, R., Seco, A. (2008) A pilot-scale study of struvite precipitation in a stirred tank reactor: Conditions influencing the process, Bioresource Technology, 99, 6285-6291.

Powell, N., Shilton, A. N., Pratt, S., Christt, Y. (2008) Factors influencing luxury uptake of phosphorus by microalgae in waste stabilization ponds, Environ. Sci. Technol., 42, 5958-5962.

Shu, L., Schneider, P., Jegatheesan, V., Johnson, J. (2006) An economic evaluation of phosphorus recovery as struvite from digester supernatant, Bioresource Technology, 97, 2211-2216.

Song, Y. H, Qiu, G. L., Yuan, P., Cui, X. Y., Peng, J. F., Zeng, P., Duan, L., Xiang, L. C., Qian, F. (2011) Nutrients removal and recovery from anaerobically digested swine wastewater by struvite crystallization without chemical additions. J. Hazard. Mater., 2011, 140-149.

Vaccari, D. (2009) P: A Looming, Scientific American, 300, 42-47.

Ye, Z. L., Chen, S. H., Wang, S. M., Lin, L. F., Yan, Y. J., Zhang, Z. J., Chen, J. S. (2010) Phosphorus recovery from synthetic swine wastewater by chemical precipitation using response surface methodology, J. Hazard. Mater., 176, 1083-1088.

Zhang, T., Ding, L. L., Ren, H. Q., Xiong, X. (2009) Ammonium nitrogen removal from coking wastewater by chemical precipitation recycle technology, Wat. Res., 43, 5209-5215.

Doyle, J. D., Parsons, S. A. (2002) Struvite formation, control and recovery, Wat. Res., 36, 3925-3940.

I. Stratful, M. D. Scrimshaw and J. N. Lester* "Conditions influencing the precipitation of magnesium ammonium phosphate" Water Research.vol. 35, Issue 17, Dec. 2001, pp. 4191-4199.

* cited by examiner

METHODS AND SYSTEMS FOR WASTEWATER TREATMENT AND RESOURCE RECOVERY

CROSS REFERENCE TO RELATED APPLICATION

This application claims priority to, Chinese Application No. 201310010017.0, filed on Jan. 11, 2013, entitled "Methods and Systems for Wastewater Treatment and Resource Recovery". The Chinese Application is incorporated herein by reference in its entirety.

BACKGROUND OF THE INVENTION

Field of the Invention

The present invention relates to wastewater treatment and resource recovery processes and systems. In particular, this invention relates to the process and system for P and N removal from wastewater and recovery as usable materials by applying dolomite lime and slated dolomite lime.

Background of the Related Art

Municipal and industrial wastewater effluent, runoff and infiltration from agricultural and industrial sites, and other point and nonpoint sources increase the flux of P and N nutrients into terrestrial and aquatic ecosystems. The effluent of wastewater treatment plant (WWTP) has been recognized as one of major sources of P and N pollution. Human activities have accelerated the rate at which nutrients enter ecosystems. Elevated concentrations of nutrients in the environment has resulted in eutrophication problems worldwide, with more than about 50% of the lakes in North America, Europe and Asia being eutrophic. Eutrophication results in enhanced growth of choking aquatic vegetation or phytoplankton, which disrupts normal functioning of the ecosystem, pollutes drinking water sources, and interferers with drinking water treatment.

On the other hand, P and N element are essential nutrients for agricultural production. The existing phosphate rock resources can only maintain human demand for about 200 years. The sustainable development requires efficient P and N removal and recovery from wastewater as reusable material.

Currently, some WWTPs use P removal techniques, and a few of them have tested P recovery processes. The common methods for P removal are biological treatment (Liu et al., 1996; Lesjean et al., 2003) and chemical precipitation (Maurer and Boller, 1999; De-Bashan and Bashan, 2004). Biological P removal can be achieved via phosphate-accumulating organisms under anaerobic-aerobic conditions. However, it increases the cost and complexity for WWTP operation. Chemical precipitation uses salts of multivalent metal ions, such as calcium, aluminum and iron. Nonetheless, these additives generate hydroxide precipitates, which would increase the sludge volume and reduce sludge biodegradable property.

During wastewater treatment processes, most P and N are enriched and deposited in activated sludge (AS). Substantial amount of the deposited P and N would be released into solution when the AS is treated in the anaerobic digester. High concentration of phosphate and ammonium in anaerobic digestion effluent offers a good opportunity for the removal and recovery of these compounds. Currently, the technologies applied to remove and recover P from anaerobic digestion effluent are mainly based on the formation of phosphate precipitates (Momberg and Oellermann, 1992; Shu et al., 2006; Pastor et al., 2008; Song et al., 2007; He et al., 2007; Chen et al., 2009; Zhang et al., 2009; Ye et al., 2010; Song et al., 2011). Phosphate can be precipitated as struvite ($MgNH_4PO_4 \cdot 6(H_2O)$) via dosing magnesium salts, such as magnesium chloride. The addition of calcium compounds, such as lime, can form hydroxyapatite ($Ca_{10}(PO_4)_6(OH)_2$) precipitate with phosphate. Elevating the pH of anaerobic digestion effluent by addition of alkaline materials or by air sparging to remove carbon dioxide from the effluent can facilitate the formation of struvite as well.

U.S. Pat. No. 6,893,567 B1 discloses a biological nitrification process for conversion of ammonium to nitrate. Then magnesium chloride, calcium chloride and sodium hydroxide potassium are added into the pre-treated wastewater to promote the formation of phosphate precipitates.

U.S. Pat. No. 7,622,047 discloses a method for production of granular struvite using a fluidized bed reactor. Magnesium ion is added into the wastewater for the formation of struvite. The wastewater pH is increased to a range of 7.4-8.5 with addition of alkali and also by air stripping for removal of carbon dioxide.

U.S. Pat. No. 7,842,186 discloses a two-step process for formation of struvite precipitate in wastewater. Firstly, a wastewater containing phosphate and ammonium is treated with an anaerobic reactor. Then, the wastewater pH is increased from 8.4 to 9.6 by air stripping removal of carbon dioxide to form struvite precipitate.

In summary, the use of magnesium salts for precipitation of phosphates is expensive and application of lime is not efficient for phosphate removal and recovery. So far no technology has been developed for simultaneous removal and phosphate and ammonium with the same additive in a treatment process.

SUMMARY OF THE INVENTION

In a first aspect, the present invention comprises a method for removal and recovery of P and N from wastewater using dolomite lime or slated dolomite lime. The lime materials are added into the wastewater to provide magnesium and calcium ions and to raise the wastewater pH to greater than 8.5, preferably greater than 9, for formation of magnesium ammonium phosphate and calcium phosphate precipitates, and for conversion of ammonium to ammonia. Dolomite lime and slated dolomite lime in particulate and powder forms and in slurry or suspension can be added into the wastewater. Sufficient amounts of lime materials are added to reach a dolomite lime to phosphate content ratio and a slated dolomite lime to phosphate content ratio of greater than 0.75 and 1.0, respectively. Alkaline materials can be added as needed into the wastewater as auxiliary agent to increase the wastewater pH to higher than 8.5.

A second aspect of the present invention comprises a method and systems for removal and recovery of P and N from wastewater by mixing dolomite lime or slated dolomite lime with wastewater in a P precipitation-ammonia stripping reactor, a continuous flow precipitation reactor, or a fluidized bed precipitation reactor for 5-240 min for formation of P precipitates and conversion of ammonium to ammonia. Dolomite lime, slated dolomite lime, or their slurry and suspension is added into the wastewater pipe that is connected to the reactors for a rapid inline mixing of the additives with the wastewater. There are packing materials inside the P precipitation-ammonia stripping reactor to increase interaction of the additives with the wastewater and to facilitate ammonia transfer from liquid to gas phases. The converted ammonia is transferred from the treated wastewater to the gas phase in the P precipitation-ammonia stripping reactor.

A third aspect of the present invention comprises a method and systems for removal and recovery of P from wastewater by letting the lime treated wastewater flow from the bottom of the P precipitation-ammonia stripping reactor through a sedimentation reactor. The P precipitates are collected from the bottom of the sedimentation reactor, continuous flow precipitation reactor, or fluidized bed precipitation reactor and will be dewatered to generate solid P products.

A fourth aspect of the present invention comprises a method and systems for removal and recovery of N by passing the lime treated wastewater from the continuous flow precipitation reactor or fluidized bed precipitation reactor into an ammonia stripping tower for transfer of the ammonia from the wastewater into gas phase. The ammonia gas from the ammonia stripping tower or P precipitation-ammonia stripping reactor flows into an ammonia absorption tower to transfer the ammonia gas into an acidic solution. The acidic solution is circulated between the ammonia absorption tower and an acidic solution container to produce concentrated ammonium solution product.

BRIEF DESCRIPTION OF THE DRAWINGS

For a more comprehensive understanding of the present invention, a description of drawings of the wastewater treatment systems and results are provided below. Obviously, the following drawings represent certain application examples of the invention thereof, from which other treatment systems could be obtained by engineers and scientists in the field of wastewater and water treatment without creative efforts.

DETAILED DESCRIPTION OF THE INVENTION

The present invention comprises methods and systems for removal of P and N from wastewater and for recovery of them as usable materials. Sufficient amounts of dolomite lime or slaked dolomite lime are added into the wastewater to provide magnesium and calcium for precipitation of P, meanwhile to increase the wastewater pH to greater than 8.5 to enhance the formation of the P precipitates and to convert ammonium to ammonia. The chemical composition of dolomite lime and slaked dolomite lime is calcium magnesium oxides and calcium magnesium hydroxides, respectively. Dolomite is a common mineral, which is cheaper than magnesium salt and magnesium oxide used in existing wastewater P removal technology. The P removal efficiency by dolomite is higher than ordinary lime (calcium oxide) and other calcium compounds.

Specifically, dolomite is calcined in a temperature range between 600° C.-1500° C. for 2-12 hours to turn more than 50% of calcium magnesium carbonate $CaMg(CO_3)_2$ in dolomite into calcium and magnesium oxides. Furthermore, the calcined dolomite lime is pulverized into particles or powder with particle size of less than 10 mm to ensure the high efficiency of dolomite lime and high reaction rate of the dolomite lime treatment.

Alternatively, dolomite lime can be hydrolyzed into slaked dolomite lime powder or slurry. The dolomite lime slurry or suspension could be adjusted to a pH range of 4-10.5 to increase the availability of the magnesium and calcium in the material and their reaction rate with wastewater. Hydrochloric acid and other types of acid can be used for the pH adjustment.

Specifically, amount of dolomite lime added into the wastewater should be sufficient to reach a dolomite lime to phosphate content ratio of greater than 0.75; wherein said amount of slated dolomite lime added into the wastewater should be sufficient to reach a slated dolomite lime to phosphate content ratio of greater than 1.0.

Specifically, sufficient amount of dolomite lime or slated dolomite should added into the wastewater to increase the pH to higher 8.5. The optimal pH for the formation of magnesium ammonium phosphate is about 9 and a pH of greater than 9 is required for effective conversion of ammonium ions to ammonia gas.

Alternatively, other alkaline materials, such as sodium hydroxide, can be used as auxiliary agents to further raise the pH of the wastewater. The alkaline materials should be added into the wastewater after the addition of dolomite lime or slaked dolomite lime to minimize the effect of the alkaline materials on the interactions of lime materials with the wastewater.

Specifically, the added dolomite lime or slaked dolomite lime is mixed with the mentioned wastewater in the specified pH range for a period of time of 5-240 min so that dolomite lime or slaked dolomite lime fully reacts with the P and ammonium in the wastewater, producing magnesium ammonium phosphate precipitates, calcium phosphate precipitates, and ammonia molecules. During the treatment processes, the solid particles of dolomite lime or slaked dolomite lime are gradually dissolved to release magnesium and calcium ions to react with phosphate and ammonium in the wastewater to form the phosphate precipitates and ammonia. Meanwhile, phosphate and ammonium also react with the surface magnesium and calcium on the solid particles of dolomite lime or slaked dolomite lime to form surface precipitates. If large amount of surface precipitates is formed, it will prevent further dissolution release of magnesium and calcium from the lime particles and slow down the rate of wastewater treatment. Therefore, use of fine lime particles or dolomite slurry or suspension with relatively low pH will increase the efficiency of the treatment. Strong mixing of the dolomite lime materials with the wastewater will also increase the efficiency of the treatment, thus producing high-grade P solid products.

Specifically, dolomite lime, slated dolomite lime, or their slurry is added into the wastewater pipe for a rapid inline mixing of the additives with the wastewater. The wastewater pipe is connected to a P precipitation-ammonia stripping reactor, a continuous flow precipitation reactor, or a fluidized bed precipitation reactor. The hydraulic retention time of the wastewater in the reactor is 5-240 min for formation of P precipitates and conversion of ammonium to ammonia. There are packing materials inside the P precipitation-ammonia stripping reactor to increase interaction of the additives with the wastewater and to facilitate ammonia transfer from liquid to gas phases.

Specifically, the P precipitates formed in the reactors is separated from the treated wastewater for recovery of the solids. The solids settle to the bottom of the continuous flow precipitation reactor during 20-120 min of settling and are collected from the bottom for dewatering and drying to produce solid P product. The linear velocity of the upward flow of treated wastewater in the settlement zone of the fluidized bed precipitation reactor should be below 0.6 cm/min, so that the solid product is settled at the bottom of the fluidized bed precipitation reactor. The precipitate collected from the bottom of the settling vessel or fluidized bed precipitation reactor is dehydrated by centrifugation or filtration and dried to prepare ammonium phosphate solid product.

Specifically, the conversion of ammonium to ammonia molecules and subsequent transfer of ammonia molecules from the wastewater to gas phase occur in the P precipitation-ammonia stripping reactor. In other treatment systems, ammonium is converted to ammonia molecules in the continuous flow precipitation reactor or fluidized bed precipitation reactor. Then, ammonia molecules are transferred from the treated wastewater to gas phase in ammonia stripping tower. It is necessary to add enough dolomite lime, slaked dolomite lime, or other alkali compounds to raise the wastewater pH to be above 9 for efficient concersion of ammonium to ammonia molecules.

Specifically, ammonia gas is blown into an ammonia absorption tower, where the ammonia is absorbed by acid solution. The acid solution can be prepared with carbonic acid, sulfuric acid or hydrochloric acid, etc. Ammonia is concentrated in the acidic solution to form ammonium compounds that can be used as fertilizer and industrial materials.

Specifically, gas is continuously circulated between ammonia stipping tower and absorption tower to transfer ammonia from the wastewater into the acid solution. The closed loop gas system saves energy and avoids emission of gas.

The following examples are intended to aid in the understanding of the methods and systems of the present invention and are not intended, to limit the scope or spirit of the invention in any way.

EXAMPLE 1

Removal of Phosphorus from Wastewater by Dolomite Lime

Figure 1:
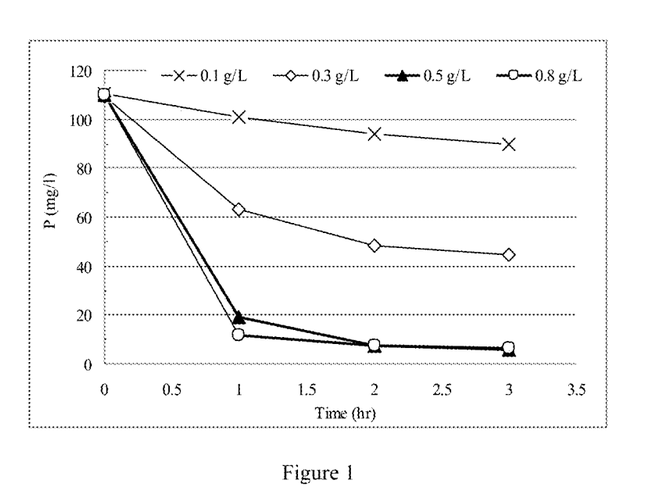
FIG. 1 is a diagram of P removal results by treatment of a wastewater using dolomite lime.

The anaerobic digestion effluent of a municipal wastewater treatment plant was treated with different amounts of dolomite lime powder in a continuously mixed batch reactor. FIG. 1 shows the treatment results for dolomite lime dosage of 0.1, 0.3, 0.5, and 0.8 g/L. The residual phosphourous concentration in the effluent decreased when dolomite dosage increased from 0.1 to 0.5 g/L. The P concentration was decreased from 110 mg/l in the effluent to 8 mg/l within 2 hours of the treatment. There was no much improvement in the P removal when the dolomite dosage increased from 0.5 to 0.8 g/L. The optimal dose of dolomite lime for treatment of the anaerobic digestion effluent was 0.5 g/l.

EXAMPLE 2

Chemical Composite of the Recovered Solids

Figure 2A:
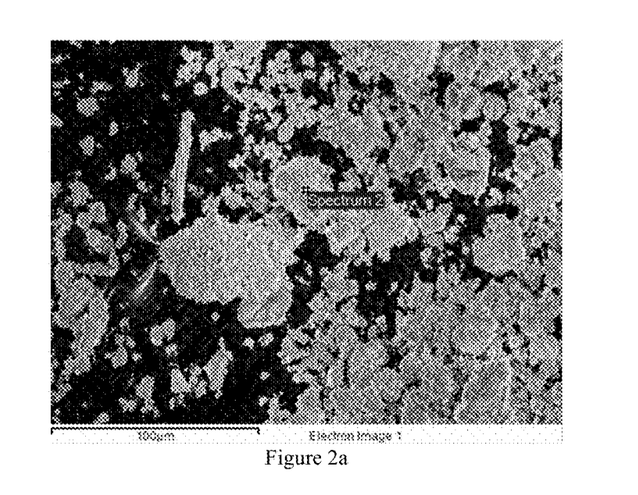
FIGS. 2a and 2b are a scanning electron photomicrograph and energy dispersive X-ray spectra of the solid product generated using the present invention.
Figure 2B:
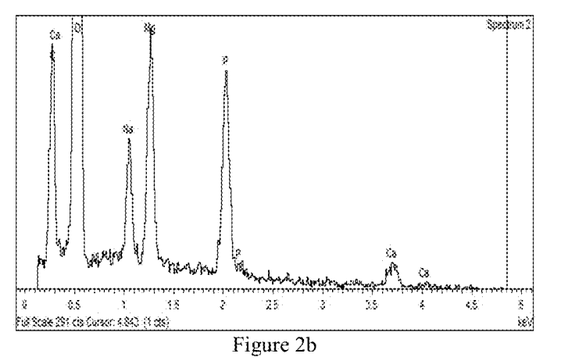

FIGS. 2a and 2b show the scanning electron microscope image and energy dispersive X-ray (EDX) spectra of the reaction solid products formed in the treatment of the anaerobic digestion effluent. The solids were air-dried before the analysis. EDX results determined that the solids contained 8% of P or 24% of phosphate. The solid product also contained ammonia and a small amount of potassium. As these three elements are the main active ingredients in fertilizer, the product can be used as fertilizer.

EXAMPLE 3

Effect of Dolomite Dosage on Wastewater pH

Figure 3:
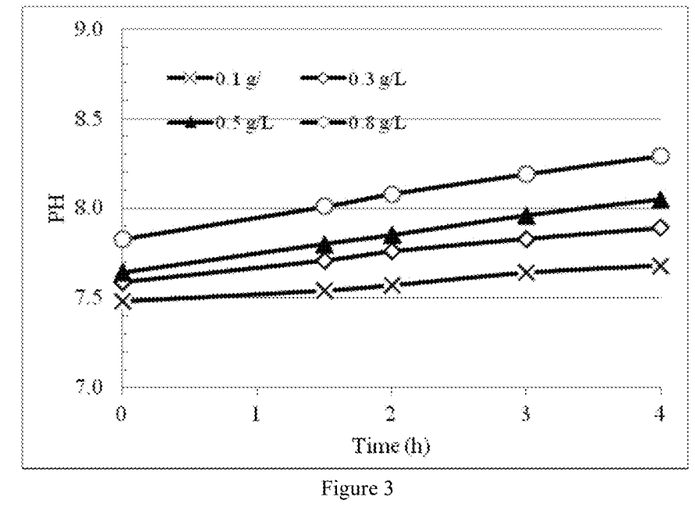
FIG. 3 is a diagram showing the pH variation of the wastewater treated with the present invention.

FIG. 3 is the graph of variation of the wastewater pH during the domolnite lime treatment. The pH value of the wastewater increased as the amount of dolomite lime increased from 0.1 to 0.8 g/L. The pH value of the wastewater also increased gradually during the 4 hours of mixing of the dolomite lime with the wastewater.

EXAMPLE 4

A Wastewater Treatment and Resource Recovery System of the Present Invention

Figure 4:
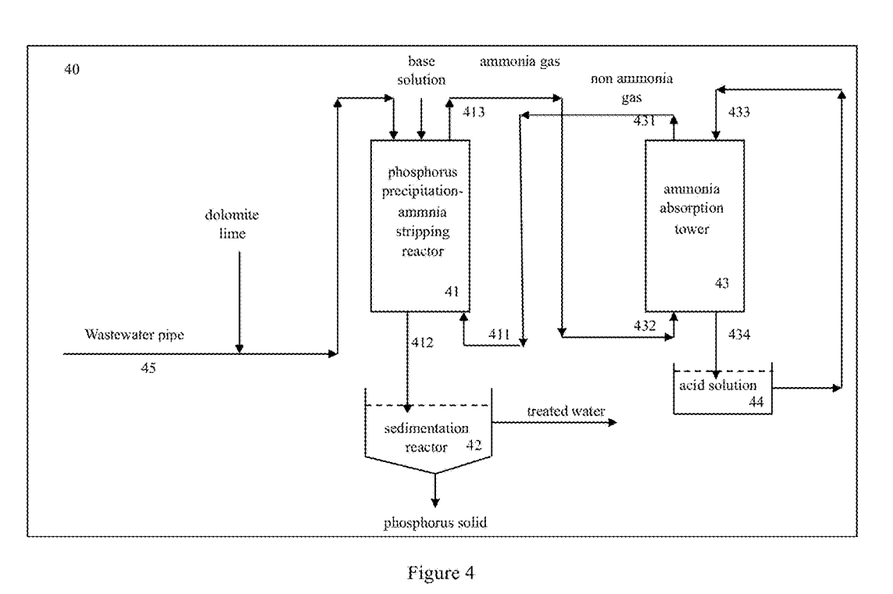
FIG. 4 is a schematic block diagram of a wastewater treatment and resource recovery system of the present invention.

FIG. 4 is a wastewater treatment and resource recovery system (40). The system consists of a P precipitation-ammonia stripping reactor (41), a sedimentation reactor (42), an ammonia absorption tower (43), an acid container (44), and a wastewater pipe (45).

Dolomite lime or slaked dolomite lime is added into wastewater inline into the wastewater pipe (45) for rapid mixing of the additive with the wastewater. The end of wastewater pipe (45) is connected to the top of the P precipitation-ammonia stripping reactor (41), where the added dolomite lime or dolomite slaked lime reacts with the wastewater to form P precipitates and to convert ammonium to ammonia molecules.

There are a gas intake port (411) and a liquid outlet port (412) at the bottom, and a gas outlet port (413) on the top of the P precipitation-ammonia stripping reactor (41). The intake (411) was connected to the gas outlet (431) at the top of the ammonia absorption tower (43). Thus non ammonia gas flows from the ammonia absorption tower (43) into the P precipitation-ammonia stripping reactor (41), where the ammonia in the treated wastewater was stripped into the gas phase. The liquid outlet (412) was connected to the sedimentation reactor (42). The gas outlet (413) was connected with the intake port 432 at the bottom of the ammonia absorption tower (43) to transfer the ammonia gas from the P precipitation-ammonia stripping reactor (41) to the ammonia absorption tower (43).

Specifically, the formation of P precipitates, conversion of ammonium ions to ammonia molecules, as well as the transfer of ammonia from the treated wastewater to gas phase take place in the P precipitation-ammonia stripping reactor (41). After the reaction, the treated wastewater flows from the bottom of P precipitation-ammonia stripping reactor (41) into the sedimentation reactor (42), where the P precipitates are separated from wastewater. Gas is blown from the bottom into the P precipitation-ammonia stripping reactor (41), stripping ammonia from the treated wastewater to the gas phase. The ammonia gas flows out from the top of P precipitation-ammonia stripping reactor (41) into the ammonia absorption tower (43) from the bottom.

Further, if necessary base solution is added into the P precipitation-ammonia stripping reactor (41) to raise the wastewater pH value. The P precipitation-ammonia stripping reactor (41) is packed with packing material to facilitate the reactions of the added dolomitic lime or slaked dolomite lime with wastewater and to increase the gas-liquid contact area and contact time.

In the ammonia absorption tower (43), there are a liquid intake port (433) on the top and a liquid outlet (434) at the bottom for circulating of acid solution between the ammonia absorption tower (43) and the acid container (44), so that the ammonia is concentrated into the acid solution.

Specifically, the non ammonia gas is blown from the top of the ammonia absorption tower (43) into the P precipitation-ammonia stripping reactor (41) again to complete the closed-loop gas circulation.

EXAMPLE 5

P and ammonium removal by the treatment system (40)

FIGS. 5a-5d present the treatment results for removal of P and ammonium under different conditions using the wastewater treatment and resource recovery system (40) described in Example 4. The anaerobic digestion effluent of a municipal wastewater treatment plant was used in the treatment tests.

Figure 5A:
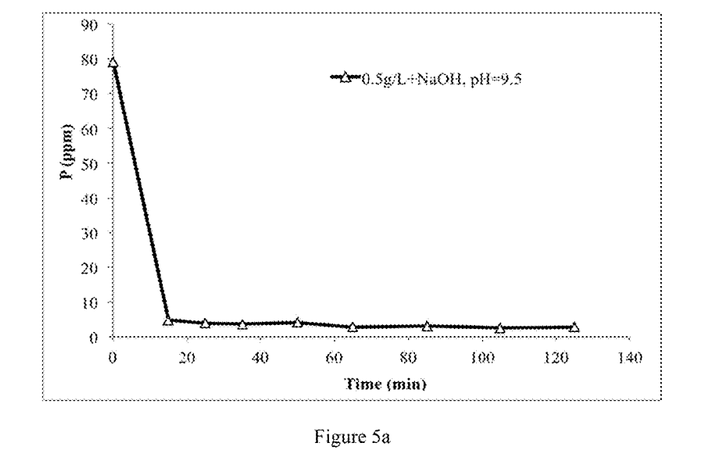
FIGS. 5a-5d are diagrams showing the removal of P and ammonium from a wastewater at different dolomite dosage and pH with the using the treatment system illustrated in FIG. 4.
Figure 5B:
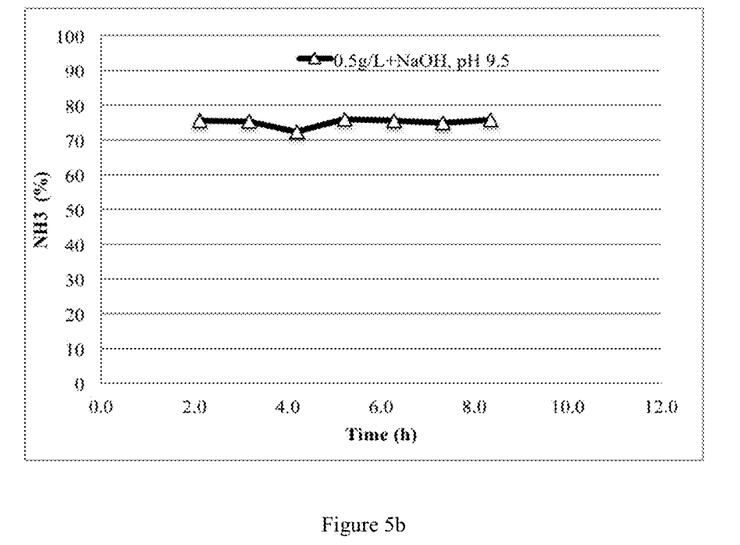

In a treatment, the pH value of the wastewater was adjusted to approximately 9.5 using sodium hydroxide solution after the addition of 0.5 g/L of dolomite lime. FIG. 5a shows that phosphate concentration was reduced from 79 mg-P/L in wastewater to less than 5 mg-P/L. Meanwhile, about 75% of the ammonium was removed from wastewater. Ammonium concentration in the raw wastewater was about 1000 mg/L.

Figure 5C:
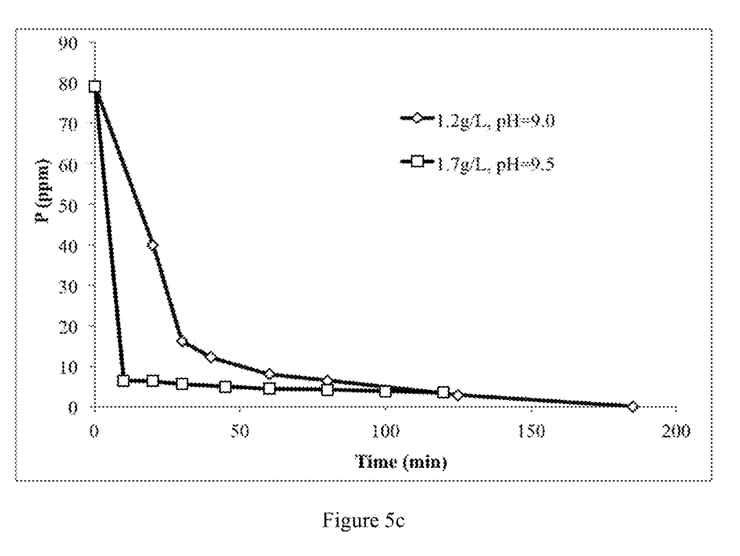

In other treatment tests, 1.2 and 1.7 g/L of dolomite lime were added into the wastewater to raise the wastewater pH to 9.0 and 9.5, respectively. FIG. 5c shows that phosphate concentration was reduced to 13 mg-P/L at 1.2 g/L of dolomite lime after 40 min of treatment. The treatment performance improved after 2 hours and phosphate concentration was reduced to 5 mg-P/L. Phosphate concentration was reduced rapidly to about 5 mg-P/L at 1.7 g/L of dolomite lime.

Figure 5D:
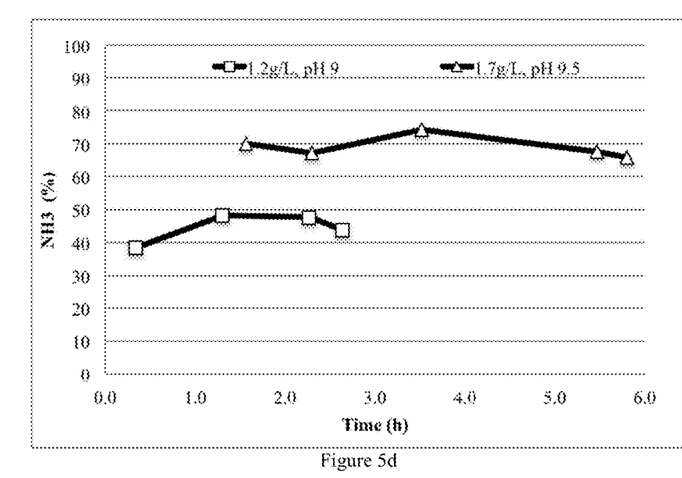

FIG. 5d shows that about 70% ammonium was removed from wastewater when the dosage of dolomitic lime was 1.7 g/L at pH 9.5. The ammonium removal rate was 40-50% at a dolomit lime dosage of 1.2 g/L and at pH 9.0. Sulfuric acid solution was used in the ammonia absorption tower (43) for removal of ammonia from the ammonia gas. The pH of the solution was controlled to less than 4 using sulfuric acid. The concentration of ammonium sulfate in the acid solution could be enriched to greater than 70%. Other acids, such as hydrochloric acid and carbonic acid, can also be used to prepare the acid solution to convert ammonia to corresponding ammonium salt solution. The concentrated ammonia salt solution can be used as fertilizer and chemical raw materials.

EXAMPLE 6

Figure 6:
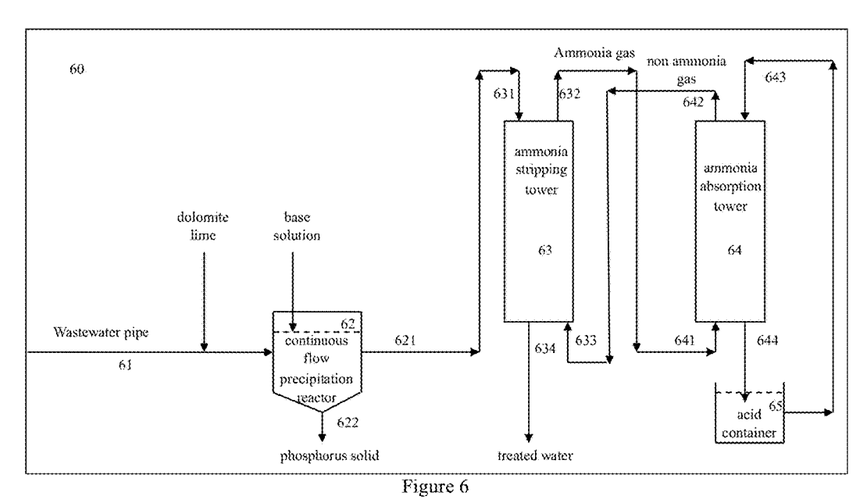
FIG. 6 is a schematic block diagram of another wastewater treatment and resource recovery system of the present invention.

Another Wastewater Treatment and Resource Recovery System of the Present Invention FIG. 6 is another wastewater treatment and resource recovery system (60). The system consists of a wastewater pipe (61), a continuous flow precipitation reactor (62), an ammonia stripping reactor (63), an ammonia absorption tower (64), and an acid container (65).

Dolomite lime or slaked dolomite lime is added into the wastewater in the wastewater pipe (61). The pipe is connected to the continuous flow precipitation reactor (62) where the added lime reacts with the wastewater to form P precipitates and to convert ammonium ions to ammonia molecules.

There are liquid outlets on the upper side and at the bottom of the reactor (62). The side liquid outlet (621) connects to the liquid inlet port (631) on the top of the ammonia stripping tower (63) to let wastewater supernatant flow into the ammonia stripping tower (63). The settled solid precipitates in the suspension are collected from liquid outlet (622) at the bottom of the reactor (62).

There are a gas outlet (632) on the top, a gas intake port (633) and a liquid outlet (634) at the bottom of the ammonia stripping tower (63). The gas outlet (632) is connected to the intake port (641) at the bottom of the ammonia absorption tower (64), so that the ammonia gas flows into the ammonia absorption tower (64). The gas intake port (633) is connected to gas outlet (642) on the top of the ammonia absorption tower (64) to blow the non-ammonia gas from ammonia absorption tower (64) into the ammonia stripping tower (63). The liquid outlet (634) is used for discharging the treated water.

On the ammonia absorption tower (64), there are also a liquid inlet port (643) on the top and liquid outlet (644) at the bottom. The two ports are used to circulate acid solution between ammonia absorption tower (64) and acid container (65) for concentrating ammonium into the acid solution.

Alternatively, the mentioned reactor (62) may be a fluidized bed precipitation reactor. In this case, the wastewater pipe (61) is connected to the bottom of fluidized bed precipitation reactor and the liquid outlet (621) is connected to the top of the reactor. Base solution is added from the bottom of the reactor when it is needed.

Specifically, dolomitic lime or slaked dolomite lime is added into the wastewater pipe (61) for rapid mixture and reaction. The added lime reacts with the wastewater for 10-180 min in reactor (62) to form P precipitates and to convert ammonium ions to ammonia molecules. The precipitates settle down at the bottom of the reactor (62) and is collected through the outlet (622) at the bottom. If necessary, base solution is added into the wastewater to raise the pH to desirable value. The top of the reactor (62) is sealed with a lid to prevent ammonia release into the air from wastewater. The wastewater supernatant enters the ammonia stripping tower (63) containing packing material through the liquid outlet (631) on top of the tower. The processing flow of the ammonia absorption tower (64) is the same as that of ammonia absorption tower (43) in system (40) of Example 4.

EXAMPLE 7

P Removal by the Treatment System (60)

Figure 7:
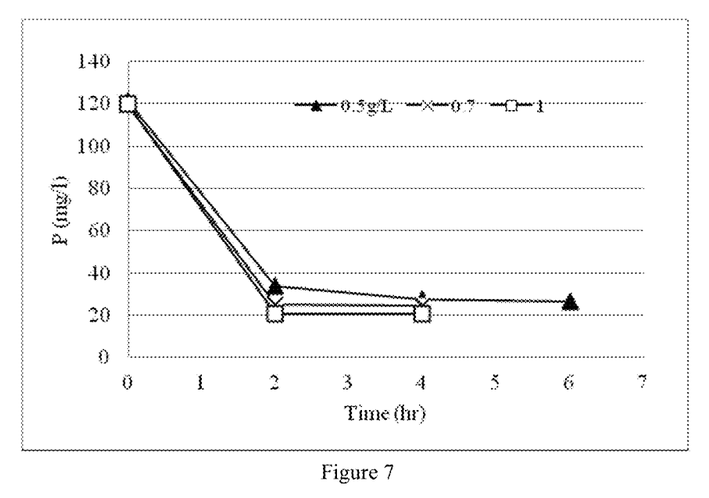
FIG. 7 is a diagram showing the removal of P from a wastewater using the treatment system illustrated in FIG. 6.

FIG. 7 shows that P removal results using the wastewater treatment and resource recovery system (60) in Example 6.

A fluidized bed precipitation reactor with an inside diameter of 5 cm and a height of 45 cm was utilized as the reactor (62). During the treatment, the anaerobic digestion effluent of a municipal wastewater treatment plant was pumped into the reactor at a flow rate of 7 mL/min. Dolomite lime suspension was added into the wastewater pipe to reach lime content of 0.5, 0.7, and 1.0 g/L. The hydraulic retention time of the wastewater in the reactor was two hours. Phosphate concentration was reduced from 120 mg-P/L in the wastewater to less than 30 mg-P/L. Effluent P concentration decreased gradually with increasing treatment time.

We claim:

1. A method for wastewater treatment and resource recovery from wastewater, comprising the steps of:
   1) providing magnesium and calcium ions to the wastewater and increasing pH value of the wastewater to 8.5-9.0 by adding dolomite lime or slaked dolomite lime into the wastewater; and mixing the dolomite lime or slaked dolomite lime with the wastewater for 5-240 min;
   2) forming magnesium ammonium phosphate and calcium phosphate precipitates, and forming ammonia gas, and separating precipitated phosphate products from the wastewater;
   3) air-stripping formed ammonia gas from the wastewater; and
   4) forming a reusable ammonia liquid by concentrating the ammonia gas into an acid solution;
   wherein the wastewater comprises more than 110 mg/L of phosphate and
   a ratio between dolomite lime added to the wastewater to phosphate content in the wastewater is greater than 0.75 or a ratio between slaked dolomite lime added to the wastewater to phosphate content in the wastewater is greater than 1.0.

2. The method of claim 1, further comprising calcining dolomite at a temperature 600-1500° C. for 2-12 hours and pulverizing the slaked dolomite lime in step 1) to a particle size of less than 10 mm.

3. The method of claim 1, further comprising hydrolyzing dolomite lime to form slaked dolomite lime.

4. The method of claim 1, further comprising preparing dolomite lime or slaked dolomite lime slurry or suspension having a PH value between 8.5-9.0.

5. The method of claim 1, further comprising after step 2 adding an alkaline compound into the wastewater as an auxiliary agent to increase the wastewater pH to higher than 8.5.

6. The method of claim 1, wherein said wastewater treatment is carried out in a continuous flow precipitation reactor, sedimentation time of the continuous flow precipitation reactor is 20 to 120 min, and settled solid precipitates are collected from the bottom of the reactor.

7. The method of claim 1, wherein said wastewater treatment is carried out into a fluidized bed precipitation reactor, upward flow velocity in the fluidized bed precipitation reactor is less than 0.6 cm/min, and settled solid precipitates are collected from the bottom of the fluidized bed precipitation reactor.

8. The method of claim 7, wherein said collected solid precipitates are dewatered with centrifugation, filtration, and/or drying to generate solid phosphate products.

9. The method of claim 1, wherein said ammonia gas is transferred from treated wastewater into gas phase in an ammonia-stripping tower.

10. The method of claim 9, wherein said ammonia gas passes through an ammonia absorption tower for transfer of ammonia into acid solution to generate concentrated ammonium solution product.

11. The method of claim 5, wherein a system used to accomplish the method in claim 5, comprises
   a phosphate precipitation-ammonia stripping reactor, an ammonia absorption tower, a sedimentation reactor, a wastewater pipe and an acid solution container,
   wherein dolomite lime, slaked dolomite lime, or their slurry or suspension is added into the wastewater pipe that is connected to the top of phosphate precipitation-ammonia stripping reactor,
   wherein phosphate precipitation, ammonium to ammonia conversion, and transfer of ammonia from the wastewater to gas phase take place in the phosphate precipitation-ammonia stripping reactor, treated wastewater containing phosphate precipitates flows out from the bottom of the phosphate precipitation-ammonia stripping reactor into the sedimentation reactor for collection of the phosphate precipitates,
   wherein the phosphate product precipitation-ammonia stripping reactor has a gas outlet at top and gas inlet at the bottom of a vessel, an outlet pipe is connected to the bottom of an ammonia absorption tower and an inlet pipe is connected to the top of the phosphate product precipitation-ammonia stripping reactor, the gas is circulated continuously to transfer ammonia from the treated wastewater to the acid solution,
   and wherein the top of ammonia absorption tower has a liquid inlet and the bottom has a liquid outlet, the acid solution is circulated between the ammonia adsorption tower and the acid container to concentrate the ammonia gas into the acid solution to generate a liquid ammonium product.

12. The system of claim 11, wherein said phosphate products precipitation-ammonia stripping reactor has an intake hole that is used to add base solution to increase the wastewater pH when it is needed.

13. The system of claim 11, wherein said phosphate products precipitation-ammonia stripping reactor contains packing materials inside to increase interaction of additives with the wastewater and to facilitate ammonia transfer from liquid to gas phase.

14. The system of claim 11, wherein said ammonia absorption tower contains packing materials inside to facilitate ammonia transfer from gas to liquid phase.

15. The system of claim 11, wherein said system comprises a continuous flow precipitation reactor, an ammonia stripping tower, the ammonia absorption tower, and the acid solution container,
   wherein dolomite lime, slaked dolomite lime, or their slurry and suspension is added into a wastewater pipe that is connected to the continuous flow precipitation reactor, phosphate products precipitation and transformation of ammonium to ammonia take place in the continuous flow precipitation reactor,
   wherein the phosphate products precipitates settle down to the bottom of the continuous flow precipitation reactor and are collected for dewatering and produce solid products,
   wherein treated wastewater flows into the ammonia-stripping tower for transfer of the ammonia into the gas,
   wherein a gas is circulated between the ammonia stripping tower and the ammonia absorption tower to transfer the ammonia from the treated wastewater into an acid solution, and wherein the acid solution is circulated between the ammonia absorption tower and the acid container to produce concentrated ammonium solution product.

16. The system of claim 15, wherein said continuous flow precipitation reactor has an inlet pipe on the top for addition of alkaline solution if needed.

17. The system of claim 15, wherein said continuous flow precipitation reactor can also be a fluidized bed precipitation reactor.

* * * * *